United States Patent
Parks et al.

(10) Patent No.: US 6,870,615 B2
(45) Date of Patent: Mar. 22, 2005

(54) DUAL BEAM SPECTROPHOTOMETER MODULAR SAMPLE SYSTEM

(76) Inventors: Robert E. Parks, 5130 N. Calle de la Cina, Tucson, AZ (US) 85718; William P. Kuhn, 9181 E. Ocotillo Dr., Tucson, AZ (US) 85749-9446; Bryan Loucks, 10321 Magdalena, Los Altos Hills, CA (US) 94022; Michael R. Jacobson, 925 N. Sonoita Ave., Tucson, AZ (US) 85711

( * ) Notice: Subject to any disclaimer, the term of this patent is extended or adjusted under 35 U.S.C. 154(b) by 115 days.

(21) Appl. No.: 10/390,817

(22) Filed: Mar. 17, 2003

(65) Prior Publication Data

US 2004/0085534 A1 May 6, 2004

Related U.S. Application Data

(60) Provisional application No. 60/422,954, filed on Nov. 1, 2002.

(51) Int. Cl.[7] .................................................... G01J 3/42
(52) U.S. Cl. ...................................... 356/319; 356/325
(58) Field of Search ............................... 356/319, 323, 356/325, 326, 328

(56) References Cited

U.S. PATENT DOCUMENTS 3,554,648 A * 1/1971 Boostrom et al. .......... 356/326
3,977,786 A * 8/1976 Gast .......................... 356/319

* cited by examiner

Primary Examiner—F. L. Evans

(57) ABSTRACT

A modular dual-beam source, sample compartment and beam-combining system are provided when used with a monochromator and detector to form a spectrophotometer consisting of: (a) a source module where two ellipsoidal mirrors each produce an image of the light source, and (b) a reflecting sample-compartment module, wherein each side has two plane-mirrors, of the four plane mirrors, three are reference and one is the sample, or (c) a transmission sample-compartment module, wherein each side has two plane-mirrors, and a sample is placed between one pair of plane-mirrors, and (d) a beam-combining module wherein the source images are imaged by a second pair of ellipsoidal mirrors on a reflective chopper that combines the images at a single location that is imaged, external to the module, by another mirror, each module being kinematically located with respect to each other so the system remains optically aligned as modules are interchanged.

15 Claims, 4 Drawing Sheets

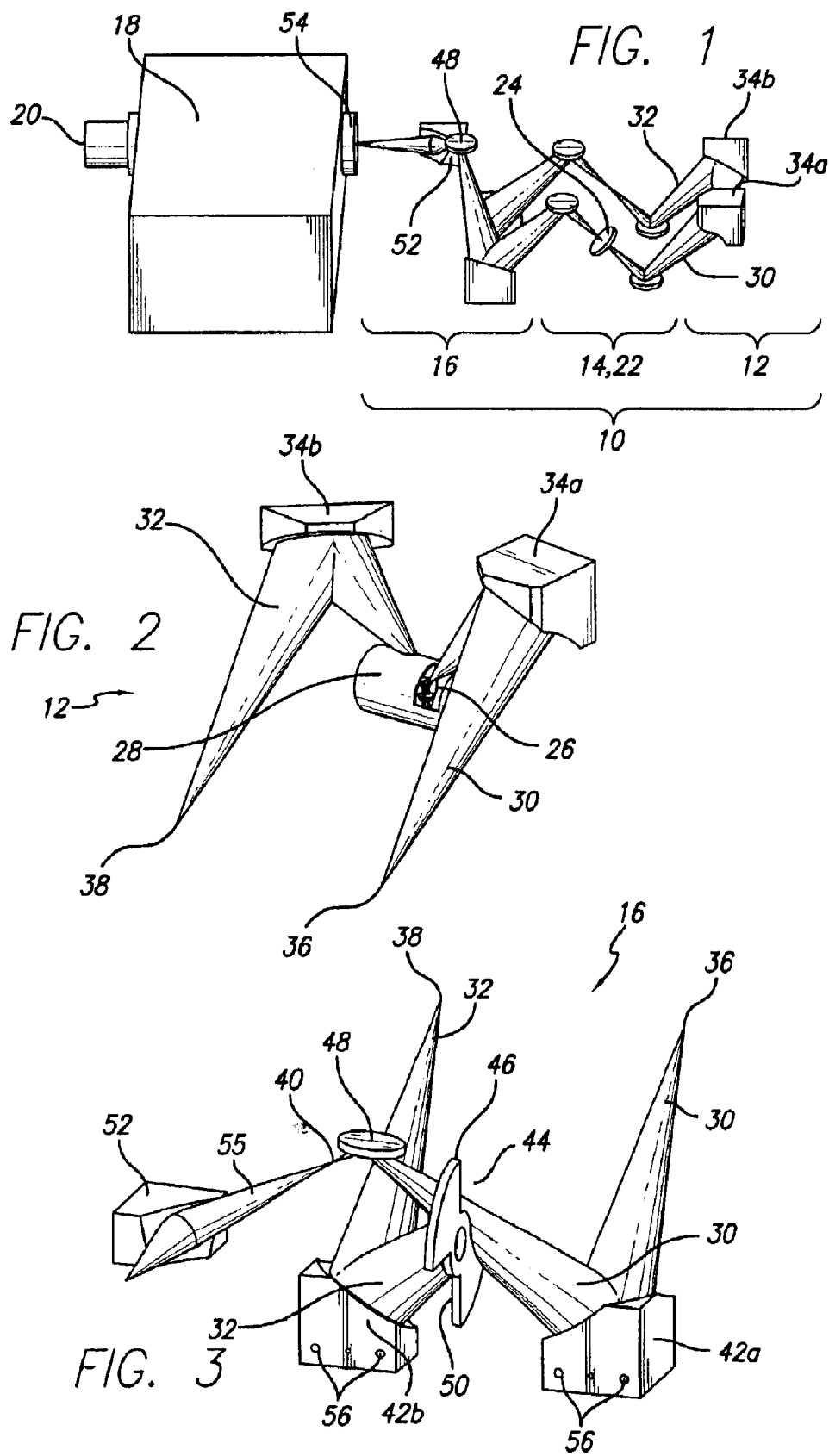

DUAL BEAM SPECTROPHOTOMETER MODULAR SAMPLE SYSTEM

CROSS-REFERENCE TO RELATED APPLICATION

The present application claims priority from provisional application Ser. No. 60/422,954, filed Nov. 1, 2002.

TECHNICAL FIELD

The present invention relates generally to dual beam spectrophotometers, and more particularly to a modular sample system used in such spectrophotometers.

BACKGROUND ART

The present inventors are building a spectrophotometer, an instrument that measures the transmission or reflectivity of a sample as a function of wavelength. In general, the components of such a system are a light source with a spectral range sufficient to cover the wavelength band of interest, a sample compartment and associated optics to capture the light from the source, transmit it through or reflect it off of the sample and then concentrate the transmitted or reflected light on the input slit of a monochromator or other device to select a particular wavelength, and finally a detector sensitive to all wavelengths of interest. Most commercially available spectrophotometers are built as an integrated unit containing all of the above components. This makes it possible to optimize the instrument for making certain measurements but at the same time limits the flexibility of the instrument.

The detector and monochromator (or spectral filtering device) are common to all spectrophotometers. On the other hand, if there is only one path from the source to the monochromator, it is difficult to calibrate the spectrophotometer as a function of wavelength to account for changes in the transmission and reflectivity of the optics with wavelength. Even more important, in the infrared, it is difficult to account for the rather sharp absorption bands in the atmosphere that severely affect the light reaching the detector. The device described below is intended for use in the infrared from about 2 to 50 $\mu$m. On the other hand, it could be extended to other wavelengths.

For this reason it is useful to temporally divide the light from the source to first go down one path to the detector and then a second essentially identical path to the detector. In this way to measure the transmission of a sample, for example, the light can pass through the sample in one path and through nothing but air in the other. Ultimately, the detector sees an alternating signal of the light through the sample versus no sample, or 100% transmission. Now as the wavelength is scanned through an atmospheric absorption band the effect of this band is imposed on both paths identically so that only the effect of the sample is seen in the measurement.

To provide for the two light paths and the recombination of these paths prior to the light entering the monochromator, there are shutters or choppers before and after the sample, the first to divide and direct the light first down one path, then the other. A reflecting chopper is used at the recombining end to let one beam fall on the monochromator input slit where there is a hole in the chopper blade and to reflect the second beam onto the slit when the blade is a plane mirror surface.

At this point, matters are fairly simple but when it is desired to measure both transmission and reflectivity with the same instrument, things become complicated. More complex yet are measurements of diffuse transmission and reflection where integrating spheres must be inserted in the optical path. Thus, there is a need for a mechanism to deal with these complexities by allowing the dual beam sample system to be assembled in the user's lab or production facility as needed for any particular measurement task, including robotically loading and unloading samples of various geometries and having the modules properly aligned both optically and mechanically.

DISCLOSURE OF INVENTION

In accordance with the present invention, a modular dual beam source, sample compartment and beam-combining system are provided that can be used together with any monochromator or spectral filter and detector having the desired spectral coverage so the combination can be used as a spectrophotometer consisting of:

(a) a source module wherein a single light source is re-imaged the same distance from the source by a pair of mirror image, off-axis, ellipsoidal mirrors down two parallel paths, and either (b1) a reflecting sample compartment module with two halves wherein one half the re-imaged light from the source falls in between two plane mirror surfaces, one of which is the sample to be measured and the other a reference surface, and in the other half the re-imaged light falls similarly in between two plane mirrors, both of which are reference surfaces, or (b2) a transmission sample compartment module with two halves wherein one half the re-imaged light from the source falls in between two plane mirror surfaces between which the sample to be measured is placed normal to the beam, while the other half is identical but has no sample, and (c) a beam-combining module wherein the two diverging light beams are re-imaged at approximately 1:1 by a pair of mirror image off-axis ellipsoidal mirrors on a reflective chopper that recombines the re-imaged source at a single location that is then re-imaged again at 1:1 by another off-axis ellipsoidal mirror to a focus external to the module, each module being kinematically located with respect to each other so that the system remains optically aligned when the modules are interchanged.

There are a number of advantages provided by the invention disclosed and claimed herein. For example, multiple types of spectrophotometric measurements can be made with a few basic modules, the source and beam-combining modules being common to all configurations. This makes a flexible spectrophotometric instrument at a fraction of the cost of special instruments for each type of measurement.

New configurations of sample compartments can be designed and built to measure special sample geometries and properties and mate precisely with existing components of the original spectrophotometer. Insertion of a new sample compartment in an existing modular sample system is as transparent as removing and replacing a bad computer card. This modular spectrophotometer system is flexible, less costly for multiple types of measurements and has less down time in case of failure of any particular module because of the ability to swap modules in the field.

Most important, the ability to reconfigure the instrument changes it from a laboratory device into a measurement system that can be used in a production environment for process control where the sample compartment is configured to match interfaces of the production line and robotic loading of samples.

Other objects, features, and advantages of the present invention will become apparent upon consideration of the following detailed description and accompanying drawings, in which like reference designations represent like features throughout the FIGURES.

BRIEF DESCRIPTION OF THE DRAWINGS

The drawings referred to in this description should be understood as not being drawn to scale except if specifically noted.

FIG. 1 depicts a conventional monochromator and detector being fed light by the modular dual beam sample system, with a transmission sample module showing a sample in one path of the dual beam system;

FIG. 2 is a schematic representation of the source module showing the source inside the rotating drum shutter;

FIG. 3 is a schematic figure of the beam-combining module showing light in two paths diverging from foci in the sample compartment and falling on off-axis ellipsoidal mirrors that re-image the light at 1:1 conjugates;

BEST MODES FOR CARRYING OUT THE INVENTION

Figure 4A:
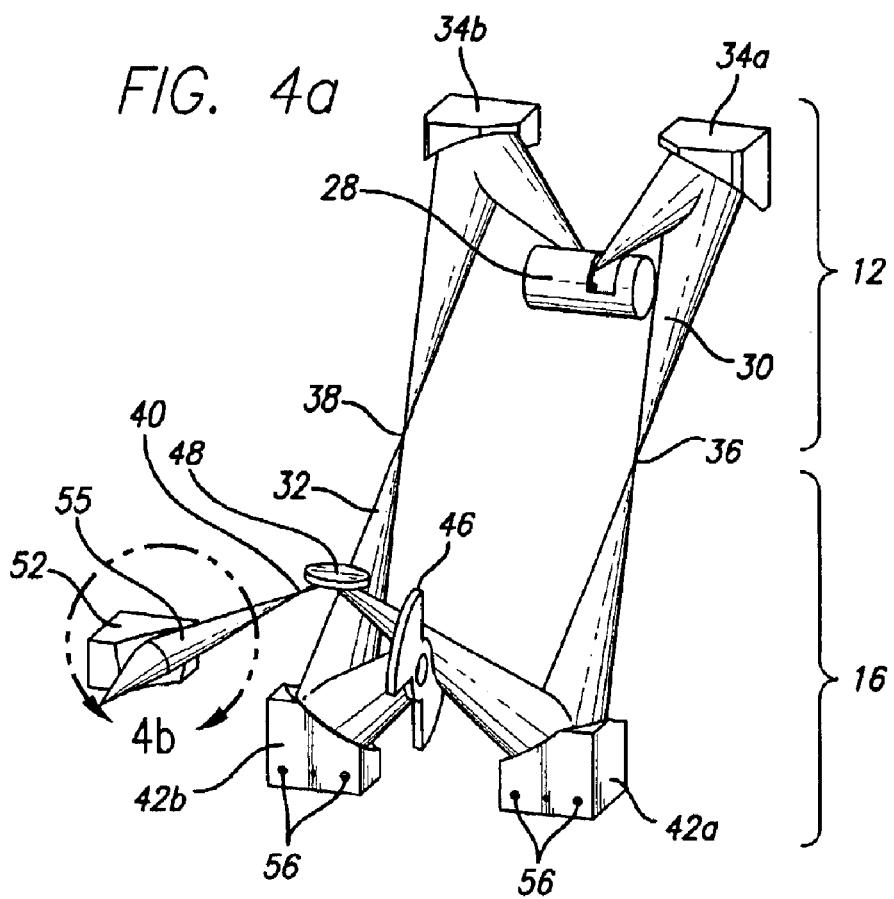
FIG. 4a is an illustration of how the source module feeds light into the beam-combining module without any sample compartment between the two modules.

Reference is now made in detail to a specific embodiment of the present invention, which illustrates the best mode presently contemplated by the inventors for practicing the invention. Alternative embodiments are also briefly described as applicable. Reference to particular locations ("left", "right", "below", etc.) are with reference to the drawings only, and are not intended to be limiting as to the actual construction of the system disclosed herein.

The dual beam modular sample system 10 is comprised of three modules; the source and beam dividing module 12, the sample module 14, which comes in several configurations, and a beam-combining module 16. In FIG. 1, the dual beam modular sample system 10 is shown to the right of a monochromator 18 (a box in this illustration) and a detector 20. The particular sample module 14 in this Figure is a transmission sample module 22, and a transmission sample 24 to be measured is shown in one light path in the module.

Turning now to FIG. 2, which illustrates a simplified perspective view of the source module 12, the source module has a single source 26 housed inside a rotating shutter 28 that serves to either block the source 26 completely, or to allow the passage of the light from the source 26 to either of two paths. The shutter 28 has four positions: two that are completely closed, one open to let light out for a first path 30 and the last open to let light out for a second path 32. Following the shutter 28 are two off-axis ellipsoidal mirrors 34a, 34b that are mirror images of each other. One focus of each ellipsoid is at the source 26. The other focus of each ellipsoid is an image 36, 38 of the source 26 for path 30 and for path 32, respectively, of the sample module 14.

In FIG. 2, cones of light following paths 30 and 32 are shown coming out of the shutter 28 toward the two off-axis ellipsoidal mirrors 34a, 34b that image the source 26 at foci 36, 38 separated in space. The source 26 is shown inside the cylindrical shutter 28 (with both beams coming out simultaneously for illustration purposes only) with two f/2 beams of light 30, 32 projected toward the pair of mirror image ellipsoidal mirrors 34a, 34b. The ellipsoidal mirrors 34a, 34b image the source 26 in two f/4 cones 30, 32 that are projected into the sample compartment module 14. The ellipsoidal mirrors 34a, 34b are CNC ("Computer Numerically Controlled") machined to the exact optical prescription to precisely relay the source 26 to the required two foci 36, 38. The mirrors 34a, 34b are machined using the same locating pins on the CNC machine as are used to mount them in the box that mechanically defines the source module 12 so the foci 36, 38 have exact locations relative to mechanical features of the source module 12. This guarantees that the source module 12 can be attached to the sample compartment module 14 so the two are optically aligned.

After CNC machining to an accuracy of about 0.0001 inch, the ellipsoidal mirrors 34a, 34b are lightly ground to remove machining marks and polished to make them specular. The bare aluminum polished surface works well for this dual beam sample system 10 intended for infrared use from 2 to 50 μm wavelengths. Ellipsoidal mirrors 34a, 34b to fit a different requirement can be CNC machined by simply changing the coded description of the prescription and will fit in the source module 12 and have known focus locations 36, 38. That is, it is no more difficult to produce an optically modified version of the source module 12 than it is to make the original design.

Similarly, the beam-combining module 16 is common to all configurations of the dual beam sample system 10. This module 16 takes the two focused images of the source 36, 38 out of the sample compartment and combines them to give one image 40 of the source 26 so that in time the detector 20 (FIG. 1) is looking at the source 26 through path 30 and then through path 32. This module 16 is explained by looking at FIG. 3.

As shown in FIG. 3, light from the continuation of paths 30, 32 is imaged 1:1 by another pair of mirror image off-axis ellipsoidal mirrors 42a, 42b. The light in path 30 passes through a void 44 in a beam-combining chopper 46 to focus 40 below and left of a plane mirror 48. Light from the continuation of path 32 strikes a reflecting blade 50 of the beam-combining chopper 46 and is focused to the same place 40 below the plane mirror 48. A small off-axis ellipsoidal mirror 52 to the left images the light out of this module 16 onto the monochromator slit 54 (see also FIG. 1). Locating holes 56 are shown in the bottoms of the pair of ellipsoids 42a, 42b.

Cones of light diverge from the two images of the source 36, 38 (upper right) onto a pair of mirror image off-axis ellipsoidal mirrors 42a, 42b that image at 1:1. The beam in path 30 coming from the lower right passes through the opening 44 in the beam-combining chopper 46 and is reflected from a small plane mirror 48 that is facing down. This light goes on to a smaller 1:1 off-axis ellipsoid 52 that directs the image of the source 40 onto the monochromator input slit 54 at the correct position, angle, and f/#. The beam in path 32 coming up from the bottom center of the Figure is reflected from the mirror surface 50 of the beam-combining chopper 46 so that it too reflects off the small plane mirror 48 before entering the smaller 1:1 ellipsoid 52 at the same conjugates 40 as the beam in path 30. The position and tilt of the beam-combining chopper 46 is adjusted to insure the two beams 30, 32 have the same image conjugates 40 and directions so they exit the beam-combining module 16 as though they were one beam 55.

Again, these off-axis ellipsoidal mirrors 42a, 42b, 52 are 3-axis CNC machined to have a particular optical prescription relative to their mechanical features so the ellipsoids can be mounted in the compartment defining the module and have the focus positions 36, 38, 40 be correctly positioned to the mechanical features of the compartment. The fixturing in the 3-axis CNC machine uses the same locating pins as are used to mount the ellipsoids in the box that mechanically defines the beam-combining module 16. The mirrors are cut using a ball end mill and linear interpolation in increments small enough that the differences between each linear segment are less than the machine resolution from the desired ellipsoidal shape. Each machine pass is close enough to the previous so the cusps left by the ball end mill are less than the machine resolution. By machining in this manner, the maximum depth of the machine marks is less than 0.0001 inch and very easy to grind out of the mirror surface without changing the shape of the surface. Polishing with a flexible lap turns the surface specular and highly reflecting.

The source shutter 28 and beam-combining chopper 46 are synchronized under computer control so that the beam-combining chopper rotates twice as fast as the source shutter. The detector 20 actually sees four light signals for each revolution of the source shutter 28 or half revolution of the beam-combining chopper 46. For the first 90 degrees, the source shutter 28 is closed so that the detector 20 sees no signal in path 30. This calibrates the detector 20 background signal level in path 30. Then the source shutter 28 opens for 90 degrees to let light go down path 30 that includes the sample 24 and through the void 44 in the beam-combining chopper 46 to the detector 20 to sense transmission through the sample. For the next 90 degrees, the light is blocked by the source shutter 28 but the reflecting surface 50 of the beam combining chopper 46 now lets the detector 20 look at the background in path 32. Finally, the source shutter 28 opens for 90 degrees to let light down path 32 where there is no sample so that the detector 20 sees the source 26 without modification by a sample providing a reference level measurement. The combination of background, reference and sample measurements provides enough information to determine the reflectivity or transmission of a sample that is compensated for background signal levels and varying source and detector output with wavelength. The basic measurement produced by the instrument is the ratio of light on the detector. Clearly, the two paths 30, 32 through the dual path sample compartment will not be exactly identical due to manufacturing tolerances, slight differences in the reflectivities of the mirrors and one additional reflection from beam-combining chopper 46 seen by path 32. However, calibration of the difference in the two paths can be obtained by measuring the transmission through paths 30 and 32 with no sample in either path. Since the signals on the detector 20 should be identical for both the background and 100% light conditions, then any differences can be recorded and stored in the control computer memory. Then, during a sample run, these corrections are used to correct the data from a sample run.

Just as the source module 12 and beam-combining module 16 are synchronized in time by their choppers 28, 46, their two halves are mirror images of each other in space. FIG. 4a shows how the source module 12 directs its light into the beam-combining module 16 (sample module 14 is omitted for clarity). The second foci 36, 38 of the source module ellipsoidal mirrors 34a, 34b are the first foci of the beam-combining ellipsoidal mirrors 42a, 42b in both light paths. As can be seen in the ellipsoids 42a, 42b of the beam-combining module 16, there are holes 56 for locating pins (not shown) so that these mirrors are accurately positioned; thus, the locations of the foci are well known and identical for all instruments and all modules. Similar locating holes 56 are in all the ellipsoidal mirrors. Further, the modules 12, 14, 16 have kinematic locators for joining various combinations of modules together so that they are aligned optically and mechanically for all practical configurations. It is also clear from FIG. 4a how changing the optical prescription of one pair of ellipsoids would impact the mechanical spacing of the modules. However, the prescription and the mechanical locations are absolutely tied together so that changes can be made and accounted for in a changed mechanical design that will allow the use of new modules with existing modules.

As illustrated in FIG. 4a, the output foci 36, 38 of the source module 12 are strictly conjugate with the input foci 36, 38 of the beam-combining module 16. While FIG. 4a shows both beams 30, 32 exiting and entering their choppers 28, 46 for the purpose of illustration, it is obvious how the two choppers can be positioned relative to each other to give no light, light down path 30 and no light, light down path 32.

The third module 14 of the dual beam system 10 is the sample compartment itself. It is located between the ellipsoids 34a, 34b and 42a, 42b so the sample 24 can be placed near or at the focus (or image of the source) 36, 38 between them. In general, the sample compartments 14 are designed so that the sample 24 may be moved along the beams 30, 32 somewhat so that either a small or large area of the sample can be measured. Right at the foci 36, 38, the sampled area is about twice the size of the source 26, or 7 by 12 mm, for example (assuming a source area of 3.5 by 6 mm). The light cones 30, 32 in the sample compartment area 14 are f/4 and there is sufficient space in most sample compartment modules to roughly double the area of the sample that is interrogated by the beam.

Figure 4B:
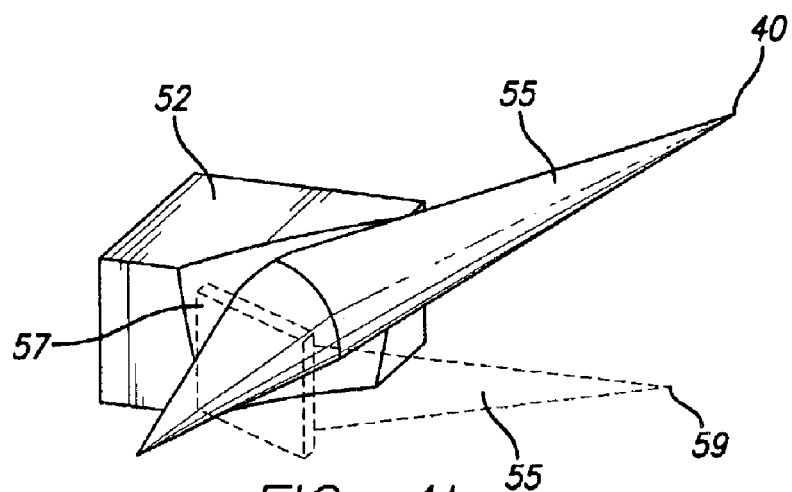
FIG. 4b is an enlargement of a portion of FIG. 4a, depicting an alternate embodiment, including an optional mirror.

FIG. 4b depicts an alternate embodiment, in which a small plane mirror 57 is provided that can be inserted in the converging beam 55 between the final ellipsoidal mirror 52 and the monochromator slit 54. Mirror 57 can be inserted prior to a measurement to view the image of the source 26 by an electronic camera (not shown) at image plane 59. Image plane 59 is conjugate with source 26. The image of source 26 will be projected on monochromator slit 54 once mirror 57 is removed from converging beam 55. Thus, insertion of mirror 57 allows the operator to see if the sample has been properly aligned to maximize the light incident on monochromator slit 54 and ultimately detector 20. The mirror 57 would be removed prior to the actual measurement.

As shown in FIG. 4b, inserting the plane mirror 57 into converging beam 55 results in the formation of reflected, converging light cone 55 thereby directing converging light cone 55 to image plane 59 where the electronic camera mentioned in the previous paragraph would be placed.

Figure 5:
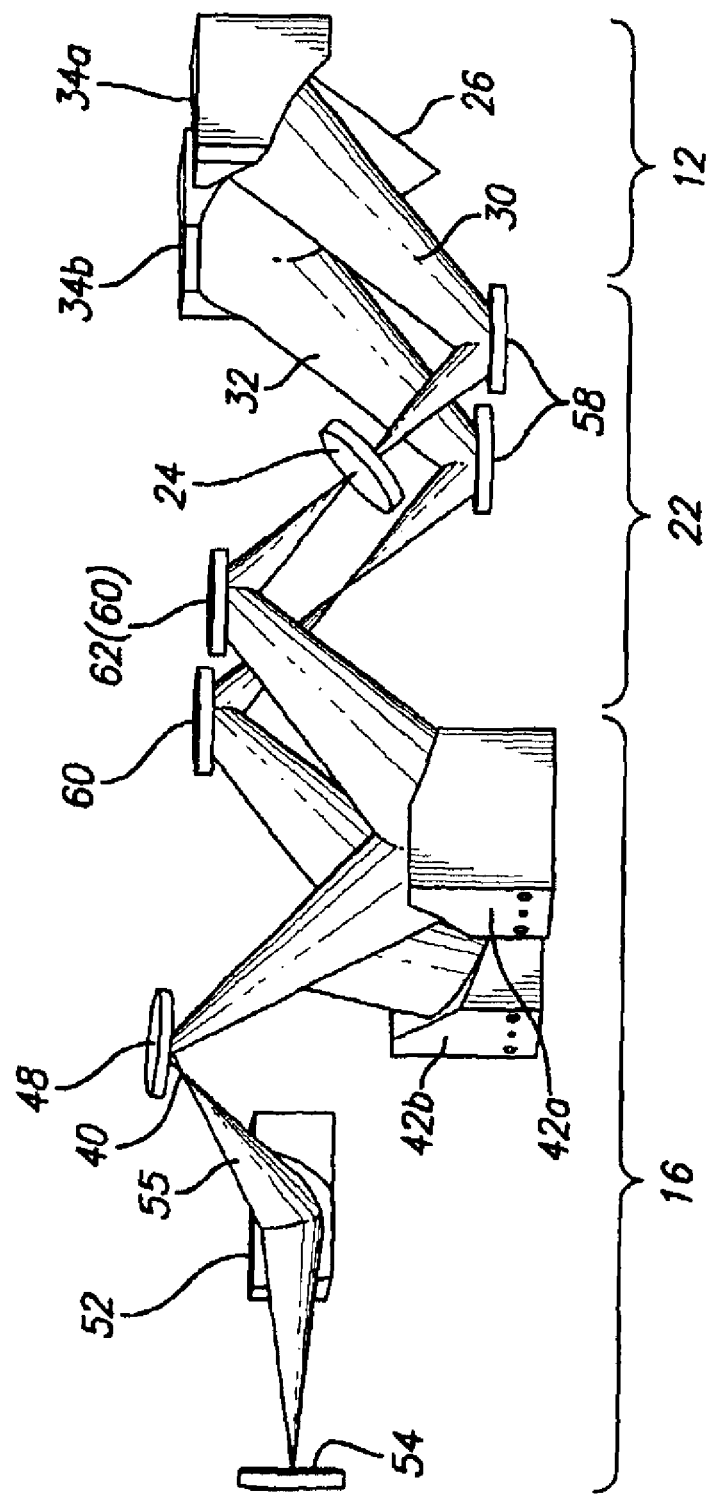
FIG. 5 is a schematic figure of the transmission sample compartment inserted between the source module on the right and beam-combining module on the left.

The simplest sample compartment 14 is the transmission one 22. As can be seen from FIG. 4a and FIG. 5, the inclusion of the transmission sample compartment 22 between the combination of source module 12 and beam-combining module 16 lowers the source module to the level of the beam-combining module as well as providing a place to insert sample 24 in beam 30. FIG. 5 shows the preferred geometry of the transmission sample compartment 22 located between the source module 12 and beam-combining module 16. Two plane mirrors 58, 60 are used in each path 30, 32 to route the beams to make a more compact instrument geometry. Also, it will be noted that this geometry means that this sample compartment can be used to measure reflectivity at a 45 degree angle of incidence by replacing one of the plane mirrors 60 with a plane sample mirror 62. (Some of the superfluous items in the source and beam-combining modules have been omitted from FIG. 5 for clarity.)

FIG. 5 shows the transmission sample compartment 22 between the source module 12 and the beam-combining module 16. Plane mirrors 58 in both beams first direct the light upward and then a second pair of mirrors 60 directs the light down into the beam-combining module 16. A sample 24 is shown in path 30 as it would be inserted for a transmission measurement. It is also clear how one of the plane mirrors 60 used to redirect the beam could be replaced by a sample mirror 62 for making a reflectivity measurement at 45 degrees. It will be noted that the sample compartment basically consists of two plane mirrors 58, 60 in each path held in a box that aligns the source module 12 to the beam-combining module 16. There is also a ledge (not shown) in the box to locate the sample 24.

Although the actual mechanical interfaces between the modules are not shown in these figures so that the details of the optical paths 30, 32 can be seen more clearly, the source module 12 ends mechanically at the left hand edge of the pair of source ellipsoidal mirrors 34a, 34b and the beam-combining module 16 starts with the right hand edge of its pair of ellipsoids 42a, 42b. The space in between is occupied mechanically by the sample module 14 (here, transmission sample module 22). The three modules 12, 14, 16 are held together mechanically at their two interface planes (these are not explicitly shown so there are no identifying numbers) with quick release screws and kinematic locators.

For making most reflectivity measurements, it is desirable to have the light 30 strike the sample 24 as close to normal incidence as possible. Practical considerations governed by the f/4 light cone prevent normal incidence but a reflectivity module 64 has been designed to permit the f/4 cone to strike a surface 24a of the sample 24 just 10 degrees off normal. To use reflectivity module 64, the transmission module 22 is unscrewed from the source module 12 and beam-combining module 16 and the reflectivity module 64 is screwed in its place. This reflectivity measurement sample compartment 64 is shown in FIG. 6.

Figure 6:
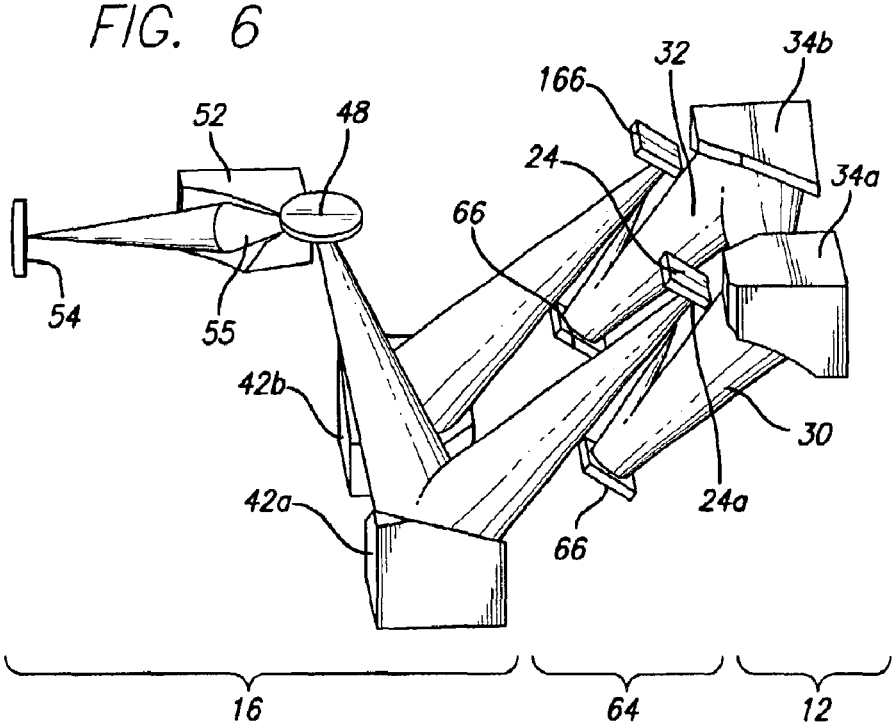
FIG. 6 is a schematic representation of the near normal incidence reflectivity sample compartment located between the source (right) and beam-combining (left) modules.

In FIG. 6, there is a fixed or reference plane mirror 66 that directs the light upward toward the sample surface 24a to be measured in path 30. The sample surface 24a reflects the light into path 30 of the beam-combining module 16. Path 32 has two fixed plane mirrors 66, 166 in the same geometry as path 30 to reflect the light into path 32 of the beam-combining module 16. Mechanically, the box holding these plane mirrors acts as a spacer to keep the source module 12 and beam-combining module 16 optically aligned to each other.

In this case, there are again two plane mirrors in each path: mirror 66 and sample surface 24a (which acts as a mirror) in path 30 and mirrors 66 and 166 in path 32. The upper plane mirror in the front path 30 is the sample surface 24a, while the other three mirrors 66, 166 are reference mirrors. The position of the sample has been adjusted so that a relatively small area on the sample surface 24a is being interrogated. Clearly, a larger area is being sampled on the lower two plane mirrors 66. The sample holders in each path are mechanically coupled so that the same size areas are being sampled in both paths 30, 32 and the sample location is adjustable to accommodate about a 4:1 ratio of areas being sampled. Although the geometry of the reflection module 64 allows a 10 degree angle of incidence measurement, it is clear from the Figure that the measurement must be made toward the edge of the sample surface 24a to avoid mechanical interference with the source module ellipsoids 34a, 34b.

Figure 7:
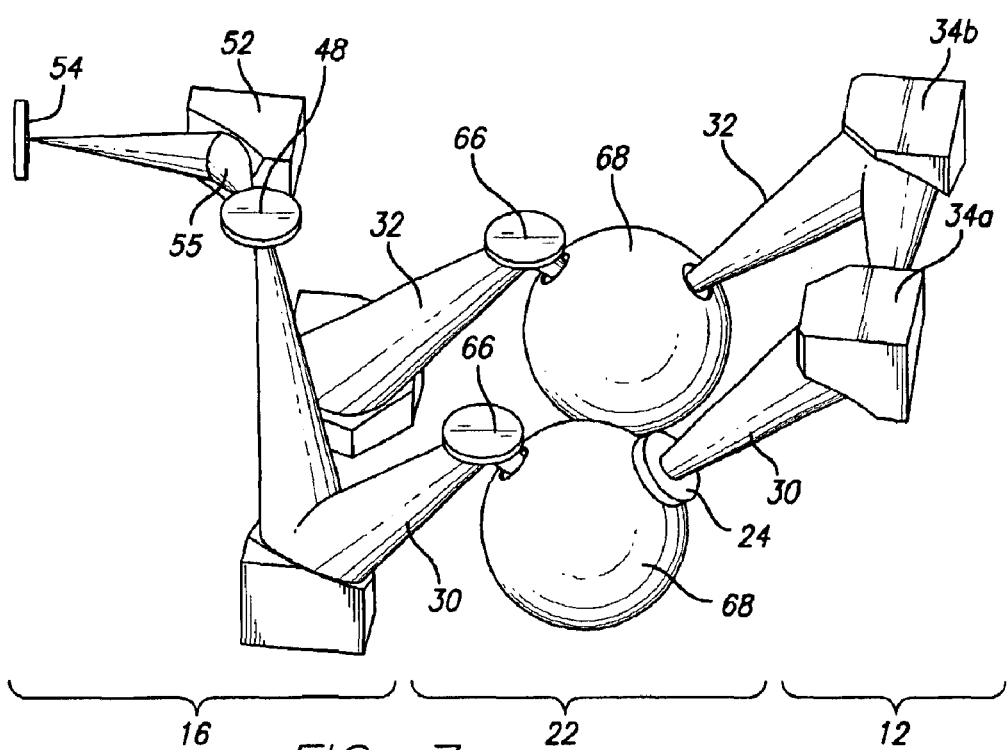
FIG. 7 is a diagram showing a sample compartment containing integrating spheres for the measurement of absolute transmission.

While it is not now presently planned, it is clear that the source module 12 could be rotated 90 degrees clockwise and the lower plane mirrors 66 rotated clockwise to 10 degrees from vertical. This would eliminate the mechanical interference between the reflectivity sample 24 and the source module ellipsoids 34a, 34b for large samples. Then, a reflecting sample 24 of any size could be measured at any position on its surface 24a. This option would make it more difficult to incorporate a varying sample area feature, but this would not be a bad compromise in many cases, particularly for automated testing of large or numerous samples with robot loading and unloading While we will not illustrate all possible variations, it is also possible to include integrating spheres 68 in the transmission sample compartment 22. The scheme in FIG. 7 shows the layout for measuring total transmission with a sample 24 at the entrance of the integrating sphere 68 in path 30. As in the other measurements, this is also a dual beam measurement with an integrating sphere 68 in each arm. This has at least two advantages: (1) it keeps the intensities in the two arms roughly balanced, a necessity because the light scattered out of the integrating sphere will be much less than the light entering, and (2) because it will be possible to account for spectral reflectivity differences in the integrating spheres 68 by running a spectrum without sample 24 in place to produce data for a correction factor for these differences.

In FIG. 7, the sample compartment contains two integrating spheres 68 and two plane mirrors 66 to direct the light scattered out of the integrating spheres into the beam-combining module 16. The sample 24 is shown at the entrance port of the integrating sphere 68 in path 30. As in the other cases of sample compartments, the box holding these components is used as a precise spacer to hold the source module 12 optically aligned to the beam-combining module 16.

INDUSTRIAL APPLICABILITY

Thus, there has been disclosed a dual beam spectrophotometer modular sample system. It will be readily apparent to those skilled in this art that various changes and modifications of an obvious nature may be made, and all such changes and modifications are considered to fall within the scope of the present invention, as defined by the appended claims.

What is claimed is:

1. A modular dual beam source, sample compartment and beam-combining system that can be used together with any monochromator or spectral filter and detector having the desired spectral coverage so the combination can be used as a spectrophotometer consisting of:

(a) a source module having a shutter, wherein a single light source is reimaged the same distance from the source by a pair of mirror image, off-axis, ellipsoidal mirrors down two parallel paths to form two images of the light source, and either (b1) a reflecting sample compartment module with two halves wherein one half the re-imaged light from the source falls in between two plane mirror surfaces, one of which is the sample to be measured and the other a reference surface, and in the other half the re-imaged light falls similarly in between two plane mirrors, both of which are reference surfaces, or (b2) a transmission sample compartment module with two halves wherein one half the re-imaged light from the source falls in between two plane mirror surfaces between which the sample to be measured is placed normal to the beam, while the other half is identical but has no sample, and (c) a beam-combining module wherein the two images of the source having traversed one of the sample compartment modules, are re-imaged at approximately 1:1 by a pair of mirror image off-axis ellipsoidal mirrors on a reflective chopper that recombines the re-imaged source at a single location that is then re-image again at 1:1 by another off-axis ellipsoidal mirror to a focus external to the module, each module being kinematically located with respect to each other so that the system remains optically aligned when the modules are interchanged.

2. The modular system of claim 1 where the sample compartment contains two integrating spheres for the measurement of total transmission.

3. The modular system of claim 1 where the off-axis mirrors are computer numerically control (CNC) machined from blocks of metal that are located by pins to the same fixed locations during machining as they are to fixed locations within the modules so the optical prescription of any module may be changed by varying the optical prescription of the mirror as input to the CNC machine without affecting the alignment of the modules when they are mounted together via their kinematic locators.

4. The modular system of claim 1 where the mirrors are CNC machined and then polished just enough to remove the machining marks and made specular without any attempt to change their shape or spatial location by polishing.

5. The modular system of claim 1 where the shutter in the source module has the form of a rotating drum with holes positioned for the light to pass through.

6. The modular system of claim 1 where the reflecting sample compartment module and source module are so aligned to avoid mechanical interference with the source module so that a sample of any size larger than the sample beam diameter can be measured for reflectivity at near normal incidence.

7. The modular system of claim 1 where the light from the source is imaged in the middle of the sample compartment, either transmission or reflection, so the sample may be moved along the light beam to interrogate a larger area when the sample is moved away from the focused position.

8. The modular system of claim 1 with the addition of an insertable small plane mirror in the converging beam between the final off axis ellipsoidal mirror and the monochromator slit that directs the image of the source onto an electronic camera, the sensitive area of which is conjugate with the source and monochromator slit, thereby allowing an operator or robotic control system to see that the sample is properly aligned prior to the start of a measurement.

9. The modular system of claim 1 with the purpose of allowing a sample to be placed in one path of the dual paths so that the signal presented to the monochromator and detector represents the transmission or reflection with first the sample in the beam and then without the sample.

10. The modular system of claim 1 with the shutter in the source module closed for 90 degrees of its revolution, open for 90 degrees toward one path through the system, closed again for 90 degrees and then open for 90 degrees through the other path of the system per revolution of the shutter and synchronized with the reflective chopper running twice as fast as the shutter so the detector sees no light in the path with the sample, then light through sample, then no light in the path with no sample and then light with no sample in that path so that the signal seen by the detector is first no light, or just background noise in the path with the sample, light through the sample representing how the sample modifies the light, then no light, or just background noise in the path with no sample and then light in that same path so the detector sees the source without modification by a sample any particular wavelength.

11. The modular system of claim 1 where the system can be used without a sample in either path of the dual system so a measure can be made of the differences of the two paths through the instrument as a function of wavelength, thereby obtaining an instrument signature, which is stored in the memory of an associated computer controlling the system so this signature can be applied as a correction when a sample is placed in the system for measurement, permitting a background and 100% signal to be obtained for both paths through the system for every configuration of source, sample compartment and beam-combining module prior to a sample measurement.

12. The modular system of claim 1 where each module is pre-aligned and manufactured without adjustments, thereby permitting modules to be replaced without need for re-alignment.

13. The modular system of claim 1 where each module is pre-aligned and manufactured without adjustments, thereby permitting modification of the geometrical arrangement of the modules and change of the optical prescription, such that the changed modules can be used with existing modules without the need for any adjustment.

14. The modular system of claim 1 wherein the optics are CNC machined according to a deterministic prescription and are located during machining by the same features as when they are assembled into the modules.

15. The modular system of claim 1 where the sample compartment is configured to be compatible with a production environment to allow the use of robotic loading of samples so that the system can be used for process control.

* * * * *